(12) United States Patent
Lee et al.

(10) Patent No.: US 8,301,211 B2
(45) Date of Patent: Oct. 30, 2012

(54) WATCH TYPE MOBILE TERMINAL

(75) Inventors: Sunghyun Lee, Seoul (KR); Jongin Im, Seoul (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 12/819,765

(22) Filed: Jun. 21, 2010

(65) Prior Publication Data

US 2011/0014956 A1 Jan. 20, 2011

(30) Foreign Application Priority Data

Jul. 20, 2009 (KR) .................. 10-2009-0066028

(51) Int. Cl.
*H04M 1/00* (2006.01)
(52) U.S. Cl. .............. 455/575.6; 455/90.3; 455/569.1; 368/13; 340/539.11
(58) Field of Classification Search .. 340/539.1–539.19; 368/10, 12, 13, 14, 47; 455/100, 575.1–575.8, 455/566, 567, 569.1, 90.1–90.3, 3.06; 292/335
See application file for complete search history.

(56) References Cited

U.S. PATENT DOCUMENTS

| 4,847,818 | A | * | 7/1989 | Olsen ............................ 368/10 |
| 6,158,884 | A | * | 12/2000 | Lebby et al. ................. 368/282 |
| 6,516,075 | B1 | * | 2/2003 | Jacobs et al. ................. 381/331 |
| 6,890,304 | B1 | * | 5/2005 | Amano et al. ................ 600/500 |
| 2003/0030595 | A1 | * | 2/2003 | Radley-Smith .............. 345/1.3 |
| 2003/0103414 | A1 | * | 6/2003 | Lyon ............................ 368/10 |
| 2007/0207793 | A1 | * | 9/2007 | Myer et al. ................... 455/419 |

* cited by examiner

*Primary Examiner* — Ajit Patel
*Assistant Examiner* — Erica Navar
(74) *Attorney, Agent, or Firm* — Birch, Stewart, Kolasch & Birch, LLP

(57) ABSTRACT

A watch type mobile terminal includes: a main body having a wireless communication module; a band connected with both ends of the main body; a buckle unit mounted to the band and detachably attaching the band to the user's wrist through a connection and releasing operation; and a signal generating unit mounted in the buckle unit, electrically connected with the main body and generating a signal for turning on power of the main body when the buckle unit is connected.

13 Claims, 11 Drawing Sheets

WATCH TYPE MOBILE TERMINAL

CROSS REFERENCE TO RELATED APPLICATIONS

Pursuant to 35 U.S.C. §119, this application claims the benefit of Korean Application No. 10-2009-0066028, filed on Jul. 20, 2009, the contents of which is hereby incorporated by reference herein in its entirety.

BACKGROUND OF THE INVENTION

1. Field of the Invention

The present invention relates to a watch type mobile terminal that can be put on user's wrist.

2. Description of the Related Art

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Also, as mobile terminals are considered a personal mobile object that can express users' personality, various designs are required.

Such demand on designs may include a structural alteration and modification allowing users to conveniently use mobile terminal, and as one of such structural alteration and modification, a watch-type mobile terminal that can be put on the user's wrist to use can be considered. Because a watch type mobile terminal serves as a clock as well as a mobile terminal, a reduction in thickness and size and simplified design are critical for designing a watch-type mobile terminal.

SUMMARY OF THE INVENTION

Accordingly, one object of the present invention is to address the above-noted and other problems.

Another object of the present invention is to provide a watch type mobile terminal implemented with a simple design with a reduced size and thickness by minimizing a mounting space of an input unit.

Still another object of the present invention is to provide a structure for allowing a user to conveniently turn on and off power of a watch type mobile terminal.

To achieve these and other advantages and in accordance with the purpose of the present invention, as embodied and broadly described herein, the present invention provides in one aspect a watch type mobile terminal including: a main body having a wireless communication module; a band connected with both ends of the main body; a buckle unit mounted to the band and detachably attaching the band to the user's wrist through a connection and releasing operation; and a signal generating unit mounted in the buckle unit, electrically connected with the main body and generating a signal for turning on power of the main body when the buckle unit is connected.

The buckle unit may include: a first buckle unit connected with a first band connected with one end of the main body; a second buckle unit connected with a second band connected with the other end of the main body; and a fastening unit for fastening or separating the first and second buckle members. Here, the signal generating unit may be disposed in one of the first and second buckle units.

The signal generating unit may be configured to turn off power of the main body when the connection of the buckle unit is released (i.e., when the buckle unit is disconnected).

To achieve these and other advantages and in accordance with the purpose of the present invention, as embodied and broadly described herein, the present invention provides in another aspect a watch type mobile terminal including: a main body having a wireless communication module; a band connected with both ends of the main body; a buckle unit mounted to the band and detachably attaching the band to the user's wrist; and a manipulation unit mounted on one surface of the buckle unit and inputting information to the main body according to a user manipulation.

The manipulation unit may be configured to input at least one of an ON/OFF command of power of the main body, a call command, a cancel command, a command for moving a cursor or a pointer, and a command for adjusting a sound or a state amount of graphics.

The manipulation unit may be configured to input an execution command of a pre-set operation mode previously set in the main body.

The manipulation unit may include: at least one key button mounted on the side of the buckle unit such that it can be pressed; and a switch disposed on a board in the interior of the buckle unit and generating a signal according to a pressing operation of the key button.

The manipulation unit may include: a slider slidably mounted on an outer surface of the buckle unit; and a switch disposed in the interior of the buckle unit and generating a signal according to a sliding movement of the slider.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

A watch type mobile terminal according to exemplary embodiments of the present invention will now be described in detail. In the following description, usage of suffixes such as 'module', 'part' or 'unit' used for referring to elements is given merely to facilitate explanation of the present invention, without having any significant meaning by itself.

The mobile terminal described in this document may include a mobile phone, a smart phone, a digital broadcasting terminal, a personal digital assistant (PDA), a portable multimedia player (PMP), a navigation device, and the like.

Figure 1:
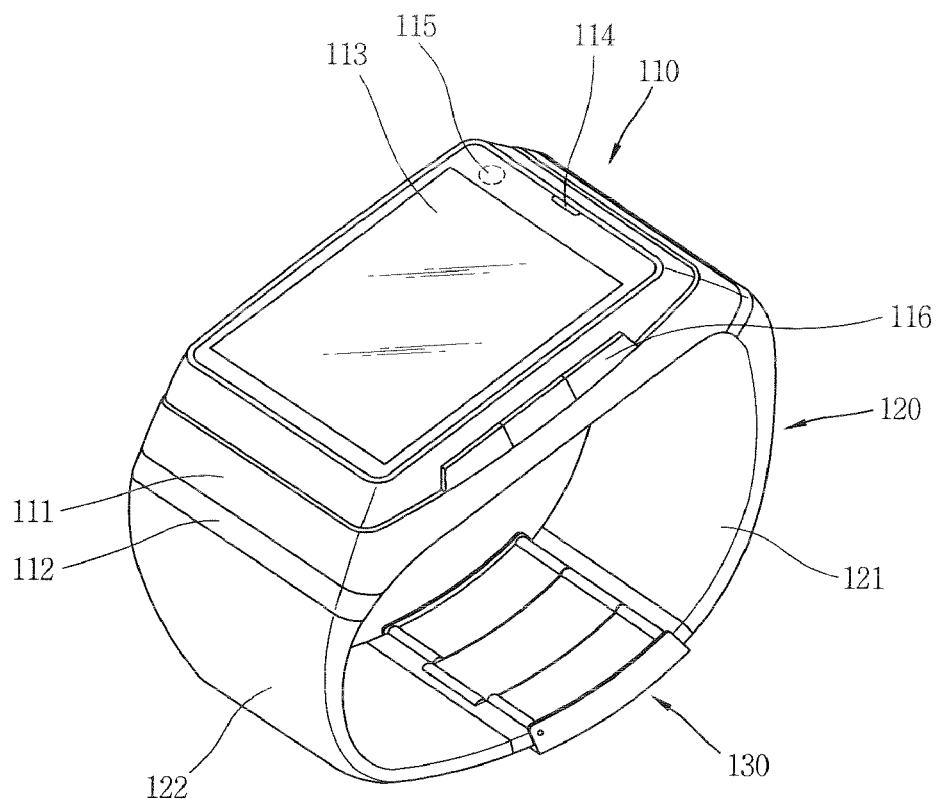
FIG. 1 is a front perspective view of a mobile terminal implementing an embodiment of the present invention.

FIG. 1 is a front perspective view of a mobile terminal implementing an embodiment of the present invention.

With reference to FIG. 1, the watch type mobile terminal includes a main body 110 and a band 120 connected with both sides of the main body 110.

Figure 7:
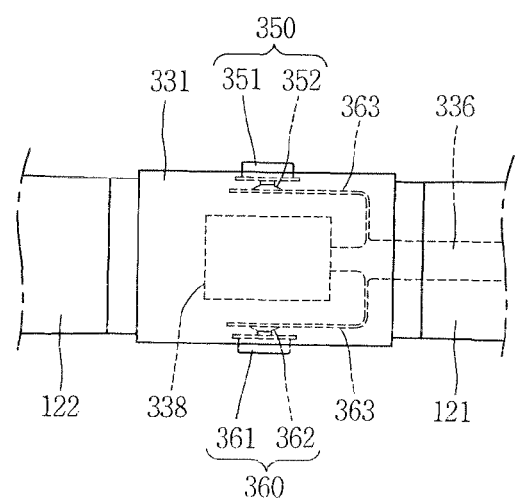
FIG. 7 is a sectional view showing an internal structure of the buckle unit illustrated in FIG. 6.

The main body 110 is configured to transmit and receive a radio signal to and from a mobile communication base station by including a wireless communication module 181 (See FIG. 7).

The case (or casing, housing, cover, etc.) constituting the external appearance of a main body 110 may be made of a synthetic resin or may be made of a metallic material such as stainless steel (STS) or titanium (Ti), etc. Various electronic components are installed in the space formed in the interior of the case.

The case may be formed by a front case 111 and a rear case 112. One or more intermediate cases may be additionally disposed between the front case 111 and the rear case 112.

The front case 111 and the rear case 112 may be formed by injection-molding a synthetic resin or may be made of a metallic material such as stainless steel or the like. The front case 111 and the rear case 112 form an internal space in which various electronic components are installed.

The band 120 is formed to be put on the user's wrist or arm. The band 150 may be made of leather, rubber, plastics, or metal material, and may have a multi-layered form by stacking several layers.

The band 120 may include a first band 121 connected with one end of the main body 110 and a second band 122 connected with the other end of the main body 110.

A buckle unit 130 is mounted on the band 120, namely, between the first and second bands 121 and 122 in order to detachably attach the band 120 to the user's wrist or arm. The buckle unit 130 can mount or separate the band 120 (or mobile terminal) on or from the user's wrist according to a connection or releasing operation.

The buckle unit 130 may be configured to tighten the space between the first and second bands 121 and 122 or release the tightened state, or configured to fasten or release ends of the first and second bands 121 and 122.

A display unit 113, an audio output unit 114, a audio input unit 115, or a user input unit 116 may be disposed on the main body 110.

The display unit 113 occupies the most parts of a circumferential surface of the front case 111. The display unit 151 may include a Liquid Crystal Display (LCD), a Thin Film Transistor-LCD (TFT-LCD), an Organic Light Emitting Diode (OLED) display, a flexible display, a three-dimensional (3D) display, or the like.

The display unit 113 may be configured to include a touch sensor to receive an input of information according to a user touch. The touch sensor may be configured to detect a touch input pressure as well as a touch input position and area. The touch sensor-mounted display unit 113 forms a touch screen.

The audio output unit 114 may include a receiver or a loud speaker.

The audio input unit 115 may be implemented in the form of a camera module for capturing an image or video of the user and so on.

The user input unit 116 refers to a device manipulated to receive a command for controlling the operation of the watch type mobile terminal. For example, the user input unit 116 may be implemented as a dome switch or a touch screen for receiving command or information according to a push or touch manipulation, or may be implemented to be manipulated by a wheel or a jog dial for rotating keys, a joystick, or the like.

Figure 2:
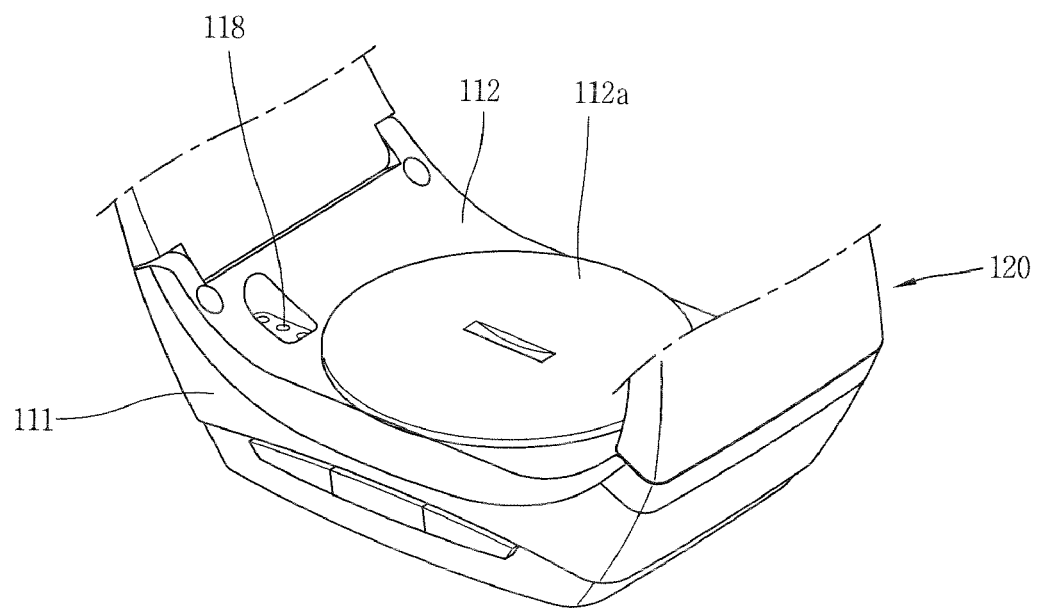
FIG. 2 is a rear perspective view of a mobile terminal implementing an embodiment of the present invention.

FIG. 2 is a rear perspective view of a mobile terminal implementing an embodiment of the present invention.

A detachable cover 112a and connection terminals 118 may be mounted on the rear case 112.

The cover 112a may be made of a synthetic resin or may be made of a metallic material such as stainless steel (STS) or titanium (Ti). The cover 112a may be mounted at a central area of the rear case 112 such that it can be detached in repairing an internal component.

The connection terminals 118 may be connected with an external charging device of a data transmission and reception device to serve as a connection passage for providing power to the terminal body 110 or transmit or receive data.

Figure 3:
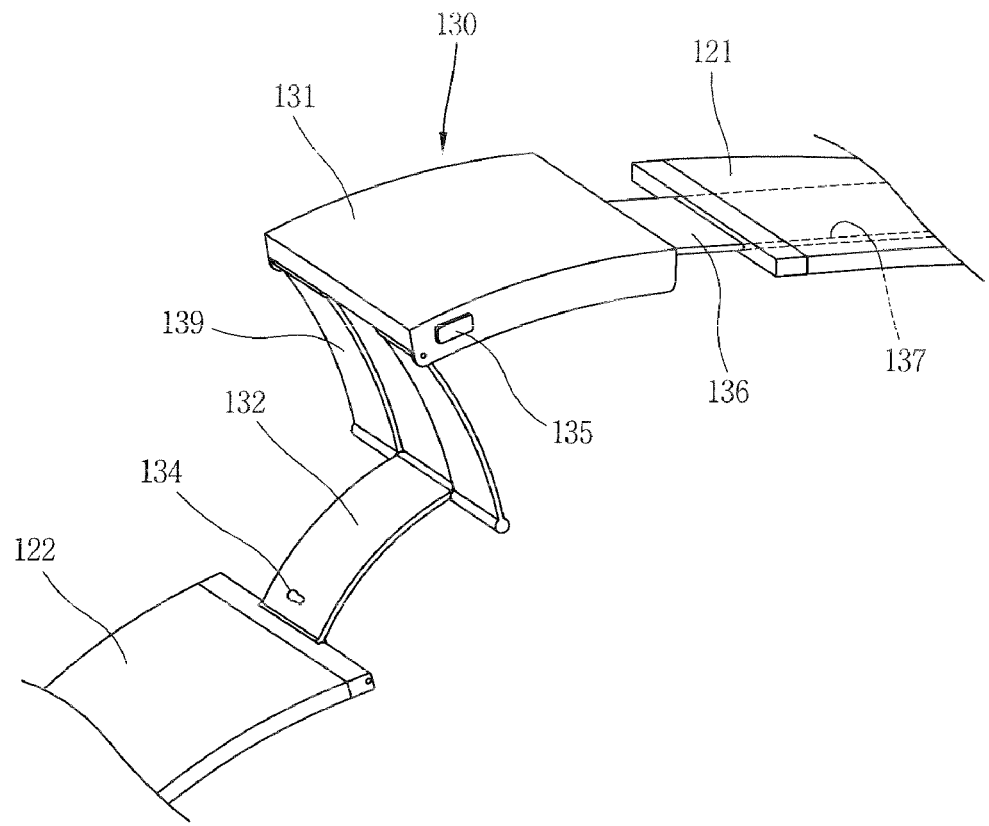
FIG. 3 is a perspective view showing the configuration of a buckle unit according to an exemplary embodiment of the present invention.

FIG. 3 is a perspective view showing the configuration of a buckle unit according to an exemplary embodiment of the present invention.

The buckle unit 130 includes a first buckle unit and a second buckle unit that are configured to be fastened to each other. The first and second buckle units are connected with the first and second bands 121 and 122, respectively. The first and second buckle units may be implemented in any form so long as they are connected with the first and second bands 121 and 122 and fastened by a fastening unit or separated.

According to the present exemplary embodiment, the first buckle unit is implemented to have a form having an internal space in which various components are mounted. The first buckle unit may be called a buckle main body 131. The second buckle unit may have a plate form extending from the second band 122. The second buckle unit may be called a fastening plate 132.

One end of the buckle main body 131 is connected with the firs band 121, and one end of the fastening plate 132 is connected with the second band 122. A connection member 139 may be connected with the buckle main body 131 and the fastening plate 132. The connection member 139 is rotatably connected with the buckle main body 131 and the fastening plate 132.

The buckle main body 131 and the fastening plate 132 are configured to be fastened to each other or separated from each other. To this end, a fastening unit may be provided between the buckle main body 131 and the fastening plate 132 in order to fasten them or separate them.

In the present exemplary embodiment, for example, the fastening unit includes a protrusion 134 formed on the fastening plate 132 and a locker (not shown) mounted in the interior of the buckle main body 131. The fastening unit may be implemented such that the protrusion 134 is locked into the locker, and in this case, the locker is configured to unlock the protrusion 134 when an unlocking button 135 of the buckle main body 131 is pressed.

Various electronic components may be mounted in the interior of the buckle main body 131, and the various electronic components are electrically connected with the main body 110 by a flexible printed circuit board (FPCB) 136. The first band 121 includes a through hole 137 formed to allow the FPCB 136 to pass therethrough.

In the present exemplary embodiment, electronic components are mounted only in the first buckle unit 131 (namely, the buckle main body), but the present invention is not limited thereto and electronic components may be mounted in both of the first and second buckle units. In this case, two FPCBs may be connected with the first and second buckle units and connected with the main body 110 via the first and second bands 121 and 122.

Figure 4A:
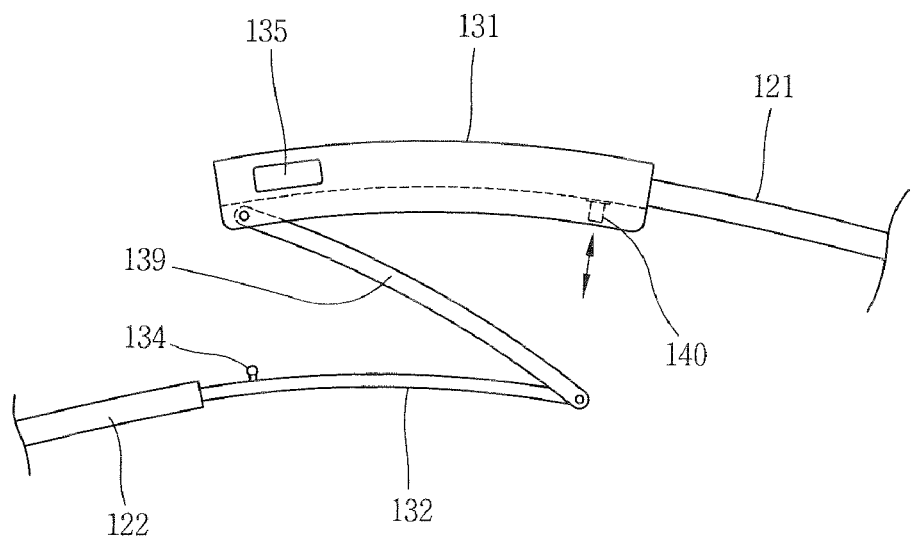
FIGS. 4a and 4b are sectional views of the buckle unit according to a first exemplary embodiment of the present invention.
Figure 4B:
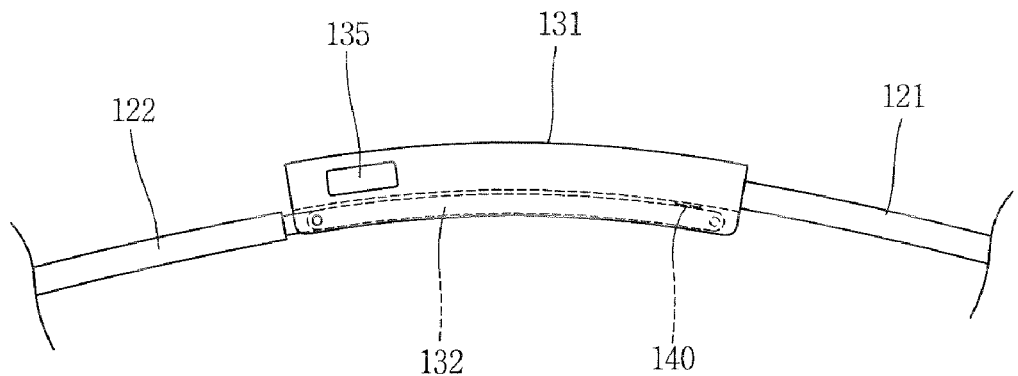

FIGS. 4a and 4b are sectional views of the buckle unit according to a first exemplary embodiment of the present invention.

FIG. 4a shows a 'connected state' in which the buckle main body 131 (i.e., first buckle unit) and the fastening plate 132 (i.e., second buckle unit), and FIG. 4b shows a 'released state' in which the buckle main body 131 and the fastening plate 132 are separated.

The buckle unit 130 includes a signal generating unit 140 for generating a signal for turning on power of the main body 110 when the buckle unit 130 is connected. The signal generating unit 140 and the main body 110 are electrically connected. The signal generating unit 140 and the main body 110 may be connected by the FPCB 136.

When the buckle unit 130 is changed from the released state to the connected state, the signal generating unit 140 transfers a signal for turning on power of the main body 110 to the main body 110, and accordingly, the main body 110 is changed from a power-off state to a power-on state.

Meanwhile, the signal generating unit 140 may be configured to turn off power of the main body 110 when the connection of the buckle unit 130 is released, namely, when the buckle main body 131 and the fastening plate 132 are separated.

As shown in FIG. 4a, the signal generating unit 140 may be implemented in the form of a switch 140 mounted in the buckle main body 131. The switch 140 may be mounted on a rear surface of the buckle main body 131 such that it can be pressed, and is configured to generate a signal for turning on power of the main body 110 according to a pressing operation.

As shown in FIG. 4b, when the buckle main body 131 and the fastening plate 132 are fastened, the switch 140 is brought into contact with the fastening plate 132 or the connection member 139 so as to be pressed, and accordingly, the switch 140 generates a signal for turning on power of the main body 110.

Figure 4C:
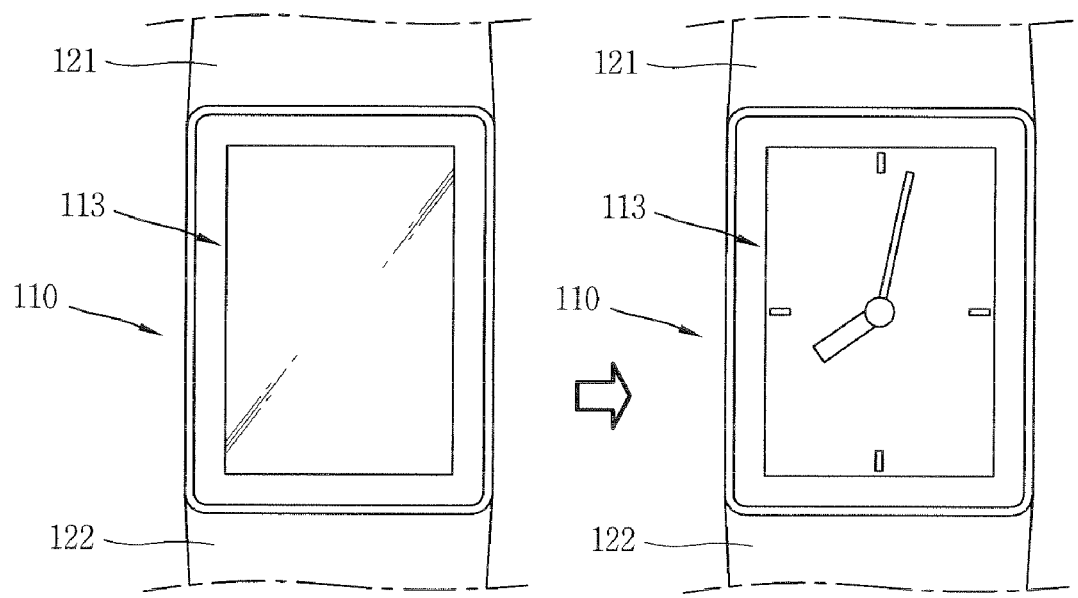
FIG. 4c is a front view showing an operational state of a watch type mobile terminal according to an operation of a signal generating unit.

FIG. 4c is a front view showing an operational state of a watch type mobile terminal according to an operation of the signal generating unit. The signal generated from the switch 140 is delivered to the main body 110, and the main body 110 is changed from a power-off state to a power-on state. In this case, the display unit 113 of the main body 110 outputs pre-set visual information. FIG. 4c illustrates an outputted graphical image in the form of a watch (or clock) indicating a current time.

In the above description, the signal generating unit 140 is mounted in the first buckle unit 131 (i.e., the buckle main body), but the present invention is not limited thereto and the signal generating unit 140 may be positioned in both of the first and second buckle units 131 and 132 or may be positioned in any one of them.

Figure 5:
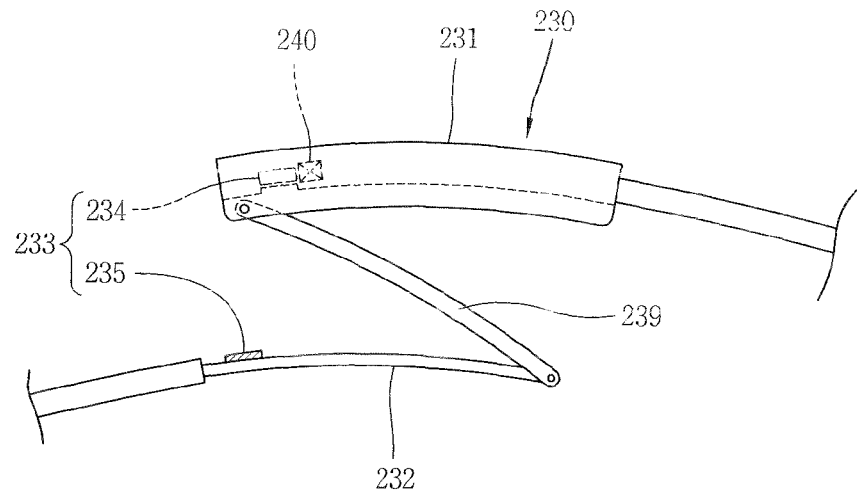
FIG. 5 is a sectional view of a buckle unit according to a second exemplary embodiment of the present invention.

FIG. 5 is a sectional view of a buckle unit according to a second exemplary embodiment of the present invention.

A buckle unit 230 according to the second exemplary embodiment of the present invention has the same configuration as that of the first exemplary embodiment of the present invention, except for the fastening unit 133 and the signal generating unit 140 in the first exemplary embodiment of the present invention. In FIG. 5, similar reference numerals are used for the elements which are the same as or similar to those of the first exemplary embodiment of the present invention.

In the present exemplary embodiment, a fastening unit 233 is implemented in the form of a pair of magnets 234 and 235 mounted in or on the first and second buckle units 231 and 232, respectively. The first magnet 234 is disposed in the interior of the buckle main body 231 (i.e., a first buckle unit) and the second magnet 235 is disposed on a front surface of the fastening plate (i.e., a second buckle unit). The first and second magnets 234 and 235 are disposed such that the mutually facing sides have the mutually opposite polarities.

Because the buckle main body 231 and the fastening plate 232 overlap with each other, the second magnet 235 is insertedly positioned in a fastening recess 238 of the buckle main body 231. In this case, the second magnet 235 is attached to the fastening recess 238 according to attraction with the first magnet positioned at one side of the fastening recess 238.

A signal generating unit is implemented in the form of a magnetic sensor 240 for sensing the strength of a magnetic field generated from at least one of the magnets. The magnetic sensor 240 senses (or detects) whether or not the buckle unit 230 is connected through a change in the strength of the magnetic field generated between the first magnet 23 and the second magnet 235. When the buckle unit 230 is changed into a connected state, the magnetic sensor generates a signal and transfers it to the main body 110.

In the first and second exemplary embodiments of the present invention, the switch 140 and the magnetic sensor 240 are illustrated as examples of the signal generating unit, but the signal generating unit may be implemented to have any form so long as it can sense whether or not the first buckle units 131 and 231 and the second buckle units 132 and 232 are fastened, namely, whether or not the buckle units 130 and 230 are connected, and generate a signal. For example, the signal generating unit may be implemented in the form of a contact sensor for sensing a contact between the first buckle units 131 and 231 and the second buckle units 132 and 232. In this case, the contact sensor may be mounted in any one of the first buckle units 131 and 231 and the second buckle units 132 and 232 and brought into contact with the other, and generates a signal according to the contact.

Figure 6:
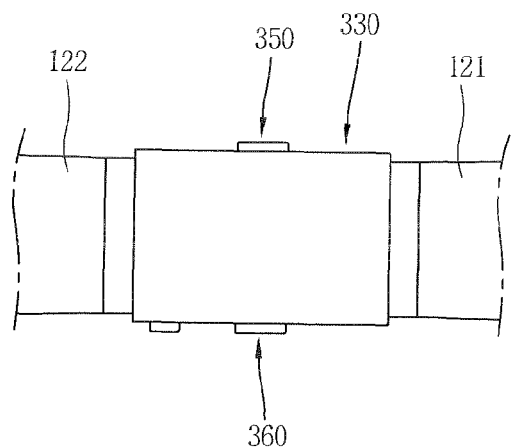
FIG. 6 is a plan view of a buckle unit according to a third exemplary embodiment of the present invention.

FIG. 6 is a plan view of a buckle unit according to a third exemplary embodiment of the present invention, and FIG. 7 is a sectional view showing an internal structure of the buckle unit illustrated in FIG. 6. In FIGS. 6 and 7, similar reference numerals are used for the elements which are the same as or similar to those of the first and second exemplary embodiments of the present invention.

In the third exemplary embodiment, manipulation units 350 and 360 include a first manipulation unit 350 and a second manipulation unit 360 mounted on both sides of the buckle main body 331. In this exemplary embodiment, the manipulation units 350 and 360 are illustrated to be mounted on the first buckle unit 351 (i.e., a buckle main body), but the manipulation units 350 and 360 may be mounted on the second buckle unit or on both of the first and second buckle units.

With reference to FIG. 7, the manipulation units 350 and 360 include key buttons 351 and 361 mounted on the buckle unit 330, specifically, on the side of the buckle main body 331 such that they can be pressed, and switches 352 and 362 for generating a signal when the key buttons 351 and 361 are pressed.

The switches 352 and 362 are mounted on boards 353 and 363 in the interior of the buckle main body 331, and deformed when the key buttons 351 and 361 are pressed. Accordingly, contact points formed on the boards 353 and 363 are connected to generate a signal.

A main board 338 may be mounted in the interior of the buckle main body 331. The boards 353 and 363, on which the main board 338 and the switches 352 and 362 are formed, are electrically connected with the main body 110 by an FPCB 336.

The manipulation units 350 and 360 may be configured to input various types of commands. The commands may include, for example, a command for turning on or off power of the main body 100, a call command (or a call connection command) for call communication, a command for canceling an inputted command, a command for shifting a cursor or a pointer, a command for adjusting a state amount of sound or graphics (e.g., sound volume), and the like.

The elements described in the first and second exemplary embodiments of the present invention, namely, the elements for turning on power of the main body 110 when the buckle units 130 and 230 are connected may be applicable. In this case, the switch 140, the magnetic sensor 240, or the like, in the former exemplary embodiments may be mounted on the main board 338.

Figure 8:
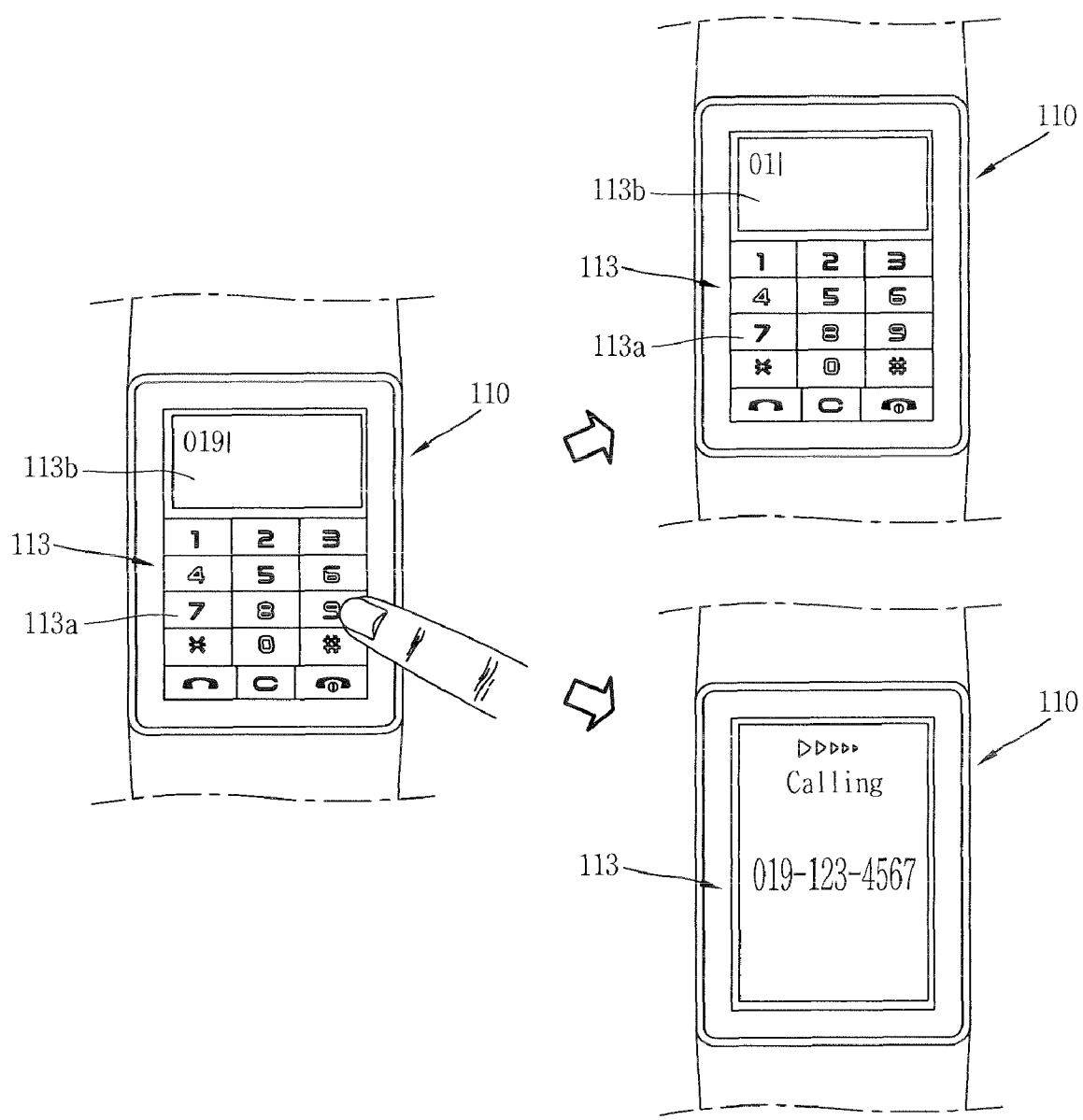
FIG. 8 is front views of the mobile terminal showing examples of operational states of manipulation units of FIG. 6.

FIG. 8 is front views of the mobile terminal showing examples of operational states of manipulation units of FIG. 6. Specifically, FIG. 8 illustrates making a call by using the watch type mobile terminal.

When the display unit 151 is implemented in the form of a touch screen, soft keys 113a including numbers are displayed on the display unit 151 to allow for inputting of a phone number. In this case, when the soft key 151a is touched, a number corresponding to the touched soft key 151a is displayed on an output window 151b.

In the present exemplary embodiment, the first manipulation unit 350 is configured to perform a call connection command (or a send command), and the second manipulation unit 360 is configured to perform a cancel command for canceling an already performed command.

When the soft keys 151 are touched, a phone number desired for a call is inputted, and then, when the first manipulation unit 350 is manipulated, a call connection is attempted to the phone number displayed on the output window 151b.

In this case, if the phone number is erroneously inputted, the second manipulation unit 360 may be manipulated to cancel the inputted content. FIG. 8 shows the case where a previously inputted number '9' is erased according to manipulation of the second manipulation unit 360.

Figure 9:
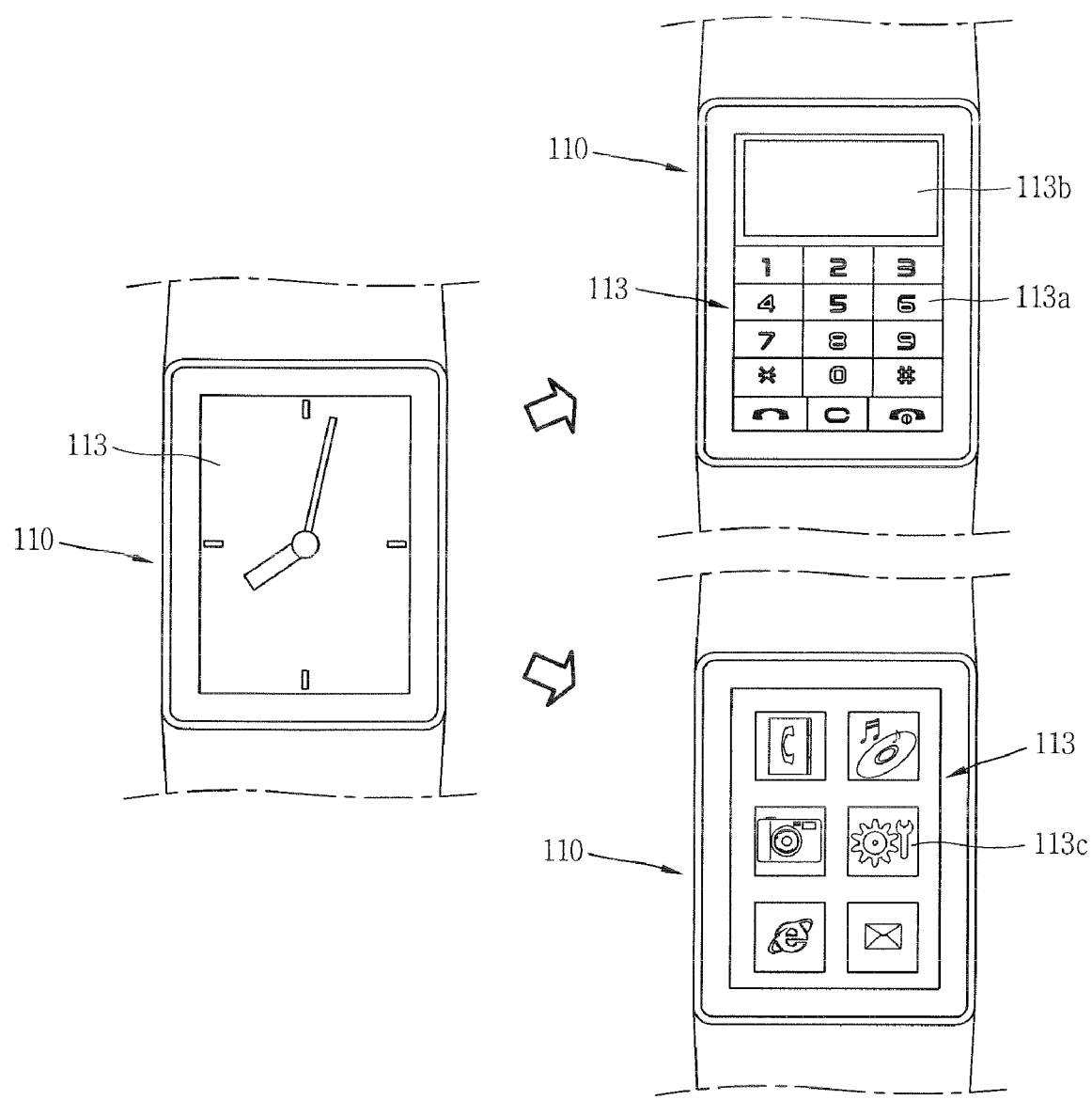
FIG. 9 is front views of the mobile terminal showing different examples of operational states of manipulation units of FIG. 6.

FIG. 9 is front views of the mobile terminal showing different examples of operational states of manipulation units of FIG. 6.

The manipulation units 350 and 360 may be configured to input an execution command of an operation mode previously set in the main body 110. The operation mode may include at least one of various types of operation modes such as a standby mode, a menu display mode, a call mode, a text message transmission and reception mode, and the like.

In the present exemplary embodiment, the first manipulation unit 350 is configured to input an execution command of the call mode and the second manipulation unit 360 is configured to input an execution command of the menu display mode. The watch type mobile terminal may be configured to output graphics indicating a current time in the standby mode as shown in FIG. 9.

When the first manipulation unit 350 is manipulated in the standby mode, the call mode is executed and the soft keys 113a for inputting a phone number are displayed on the display unit 113.

Also, when the second manipulation unit 360 is manipulated, the menu display mode is executed and icons 113c indicating various functions of the mobile terminal are displayed on the display unit 113. The user may operate a corresponding function by touching the icon 113c.

Commands assigned to the first and second manipulation units 350 and 360 may be previously set, or may be selected by the user. In this case, the user may assign a frequently used command to the first and second manipulation units 350 and 360.

Figure 10:
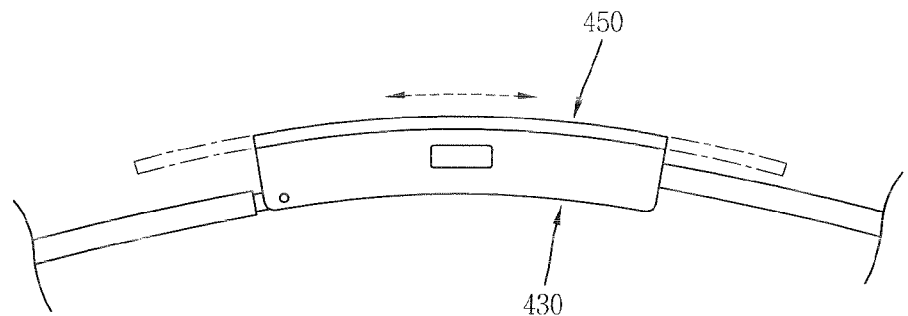
FIG. 10 is a side view of a buckle unit according to a fourth exemplary embodiment of the present invention.
Figure 11:
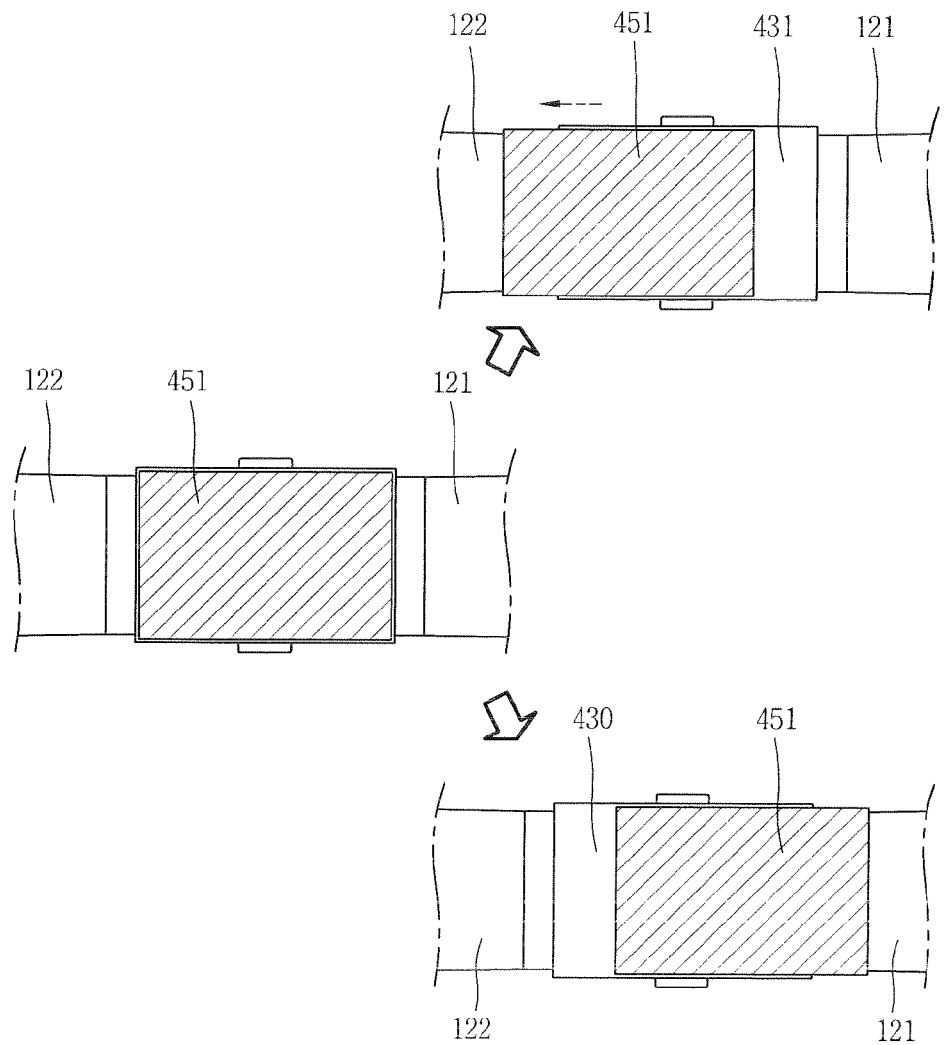
FIG. 11 is plan views of the buckle unit of FIG. 10.

FIG. 10 is a side view of a buckle unit according to a fourth exemplary embodiment of the present invention, and FIG. 11 is plan views of the buckle unit of FIG. 10. In FIGS. 10 and 11, In FIG. 5, similar reference numerals are used for the elements which are the same as or similar to those of the first to third exemplary embodiments of the present invention.

A buckle unit 430 according to the fourth exemplary embodiment of the present invention has the same configuration as that of the buckle unit 330 of the third exemplary embodiment of the present invention, except for the manipulation units 350 and 360. A manipulation unit 450 according to the present exemplary embodiment includes the buckle unit 430, specifically, a slider 451 mounted to be slidable on an outer surface of a buckle main body 431. When the watch type mobile terminal is put on the user's wrist, the slider 451 is positioned at an outer side of the buckle unit 430.

When the slider 451 slides at least in one direction, the manipulation unit 450 generates a signal for inputting a command to the main body 110.

As shown in FIGS. 10 and 11, the manipulation unit 450 according to the present exemplary embodiment is configured such that the slider 451 is movable in both directions. When the slider 451 moves in one direction, the manipulation unit 450 inputs a pre-set particular command to the main body 110, and when the slider 451 moves in a different direction, the manipulation unit 450 inputs a pre-set different command.

Commands inputted to the main body according to the movement of the slider 451 in different directions may be set to correspond to the commands assigned to the first and second manipulation units 350 and 360.

For example, it may be set such that when the slider 451 moves leftward in FIG. 11, the manipulation unit 450 inputs a call connection command to the main body 110, and when the slider 451 moves rightward in FIG. 11, the manipulation unit 450 may input a command for canceling a command previously inputted to the main body 110.

For reference, FIGS. 10 and 11 illustrate that the slider 451 moves in a horizontal direction, but when the watch type mobile terminal is put on the user's wrist, the slider 451 will move in a vertical direction based on the illustration of FIG. 1.

Figure 12A:
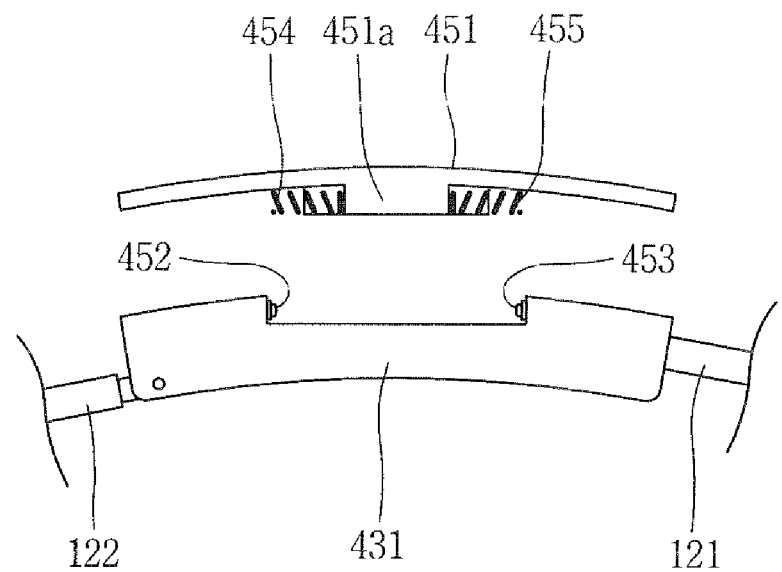
FIG. 12a illustrates a slider separated from the buckle unit.
Figure 12B:
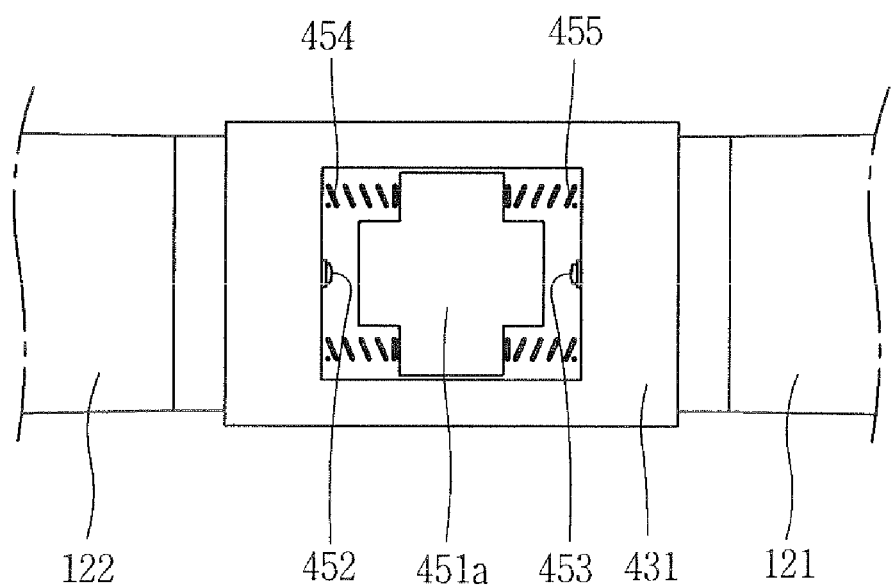
FIG. 12b is a sectional view of the buckle unit of FIG. 10.

FIG. 12a illustrates a slider separated from the buckle unit, and FIG. 12b is a sectional view of the buckle unit of FIG. 10.

A slide part 451a is formed on the rear surface of the slider 451. The slide part 451a may be slidably mounted on the buckle main body 431.

Switches 452 and 453 for generating a signal according to a sliding movement of the slider 451 is mounted on a side wall of the buckle main body 431. The switches 452 and 453 may include first and second switches 452 and 453 mounted on both side walls of the buckle main body 431, respectively. The first and second switches 452 and 453 are disposed to be brought into contact with both ends of the slider 451 according to a sliding movement of the slider 451.

The first switch 452 is pressed by the slider part 451a according to a movement of the slider 451 in one direction to generate a signal, and the second switch 453 is pressed by the slide part 451a according to a movement of the slider 451 in a different direction to generate a signal.

In the present exemplary embodiment, the first and second switches 452 and 453 may be modified into various other forms so long as they can detect the movement of the slider 451 and generate a signal.

Return springs 454 and 455 are mounted between the both ends of the slide part 451 and the side walls of the buckle main body 431 and return the slider 451 to its original position when the slider 451 moves.

Figure 13:
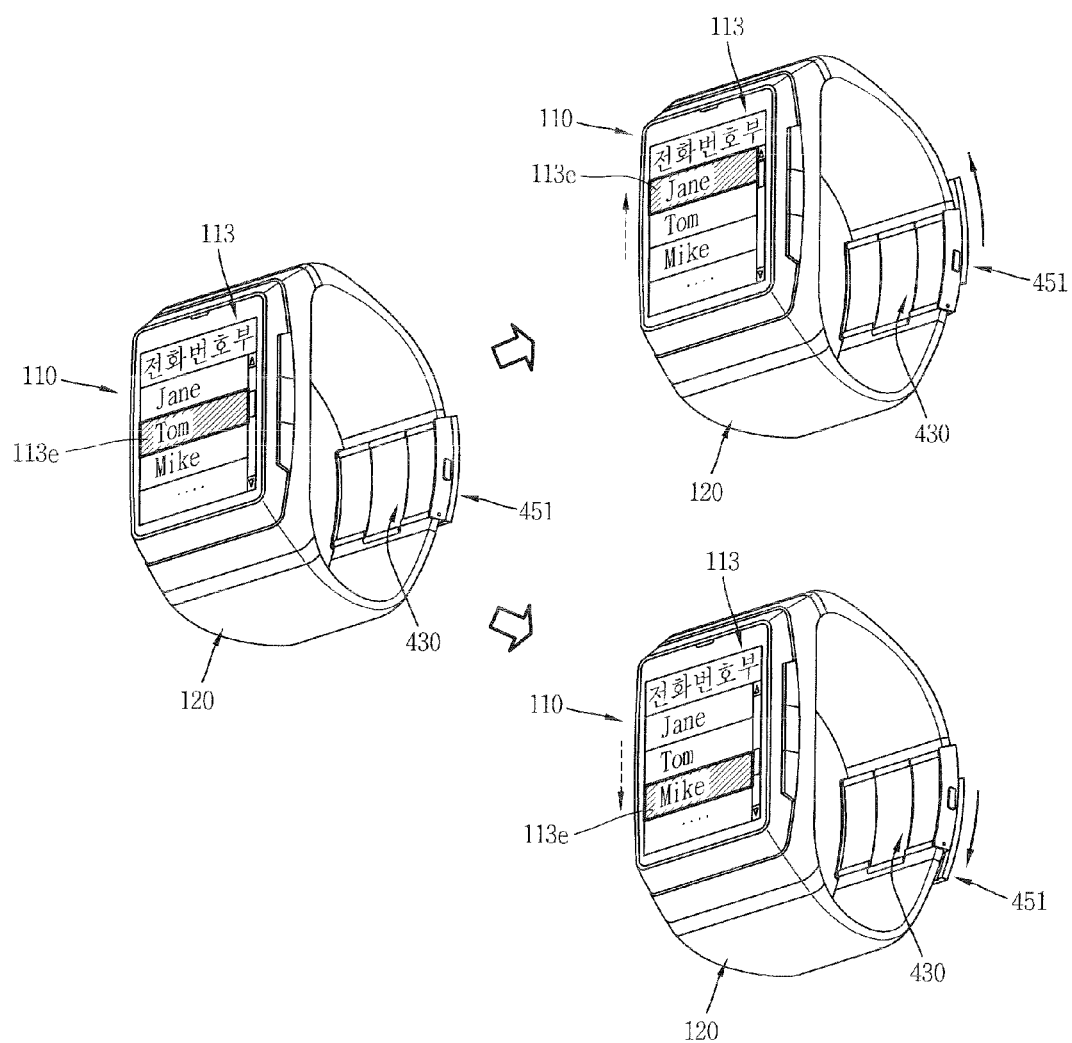
FIG. 13 is perspective views showing examples of operational states of a manipulation unit of FIG. 10.

FIG. 13 is perspective views showing examples of operational states of a manipulation unit of FIG. 10.

The first and second switches 452 and 453 may generate a signal for moving at least one of the cursor, pointer, graphics and icon displayed on the display unit 113 to the movement direction of the slider.

FIG. 13 illustrates a phone book outputted to the display unit 113, and the phone book may include a plurality of items implemented in the form of a list.

A point 113e may be positioned on one of the items, and the user may select the item on which the pointer 113e is positioned to output a phone number of the corresponding item.

In this case, when the slider 451 moves upward, the pointer 113e moves to an item positioned at an upper side of the current item from the current item. Also, when the slider 451 moves downward, the pointer 113e moves to an item positioned at a lower side of the current item from the current item. Namely, the slider 451 mounted on the buckle unit 430 allows for a scroll input too the main body 110.

Figure 14:
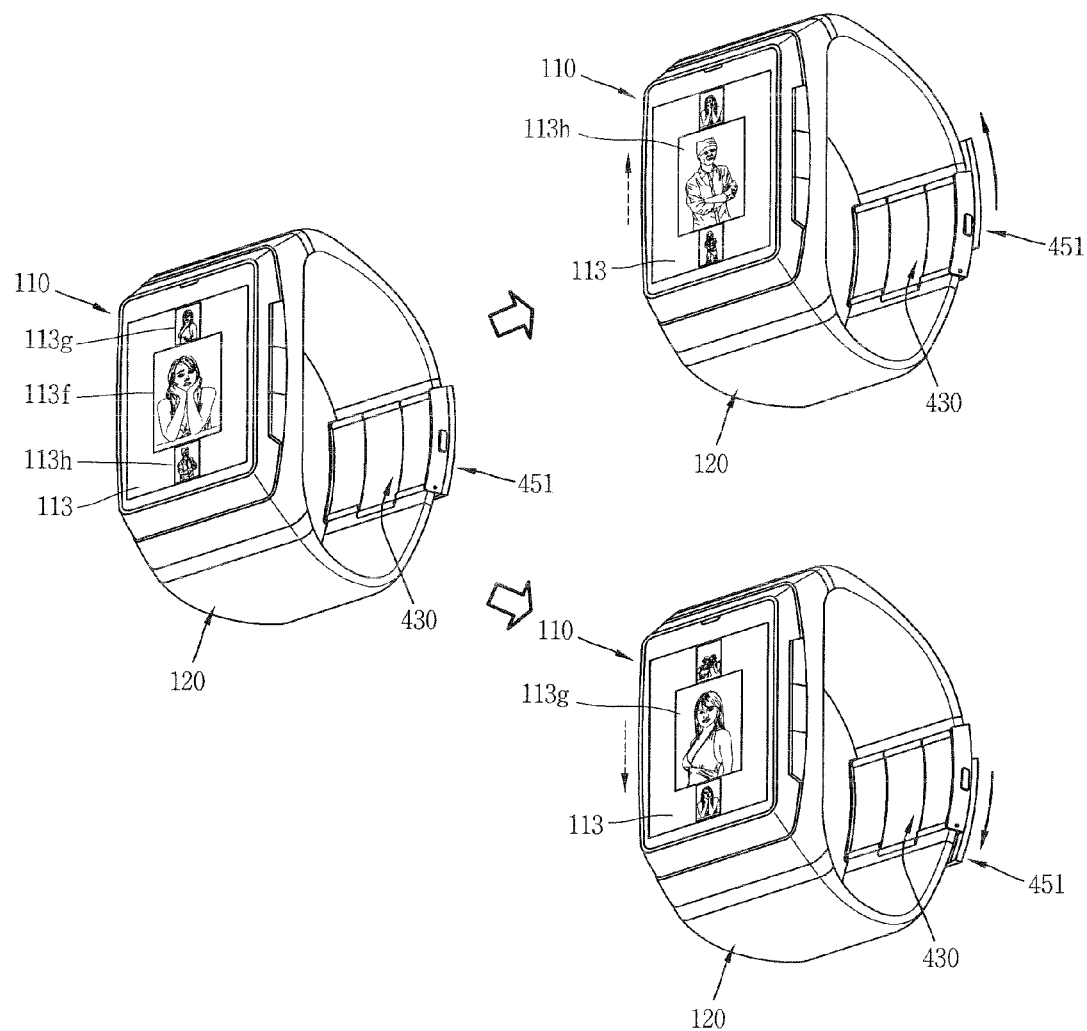
FIG. 14 is perspective views showing different examples of operational states of a manipulation unit of FIG. 10.

FIG. 14 is perspective views showing different examples of operational states of a manipulation unit of FIG. 10.

FIG. 14 shows the movement of graphics or an icon displayed on the display unit 113 by using the slider 451.

A plurality of graphics 113f (or icons) are displayed on the display unit 113 by scaling down photo images stored in the memory. The currently selected graphics 113f is magnified to be displayed at the center of the screen, and the graphics 113g and 113h at a front or rear positions in the order are displayed to be smaller at the upper and lower sides thereof.

When the slider 451 moves upward, the graphics 113h positioned at the lower side of the currently selected graphics 113f moves upward and is magnified to be displayed. When the slider 451 moves downward, the graphics 113h positioned at the upper side of the currently selected graphs 113f moves downward and is magnified to be displayed.

Figure 15:
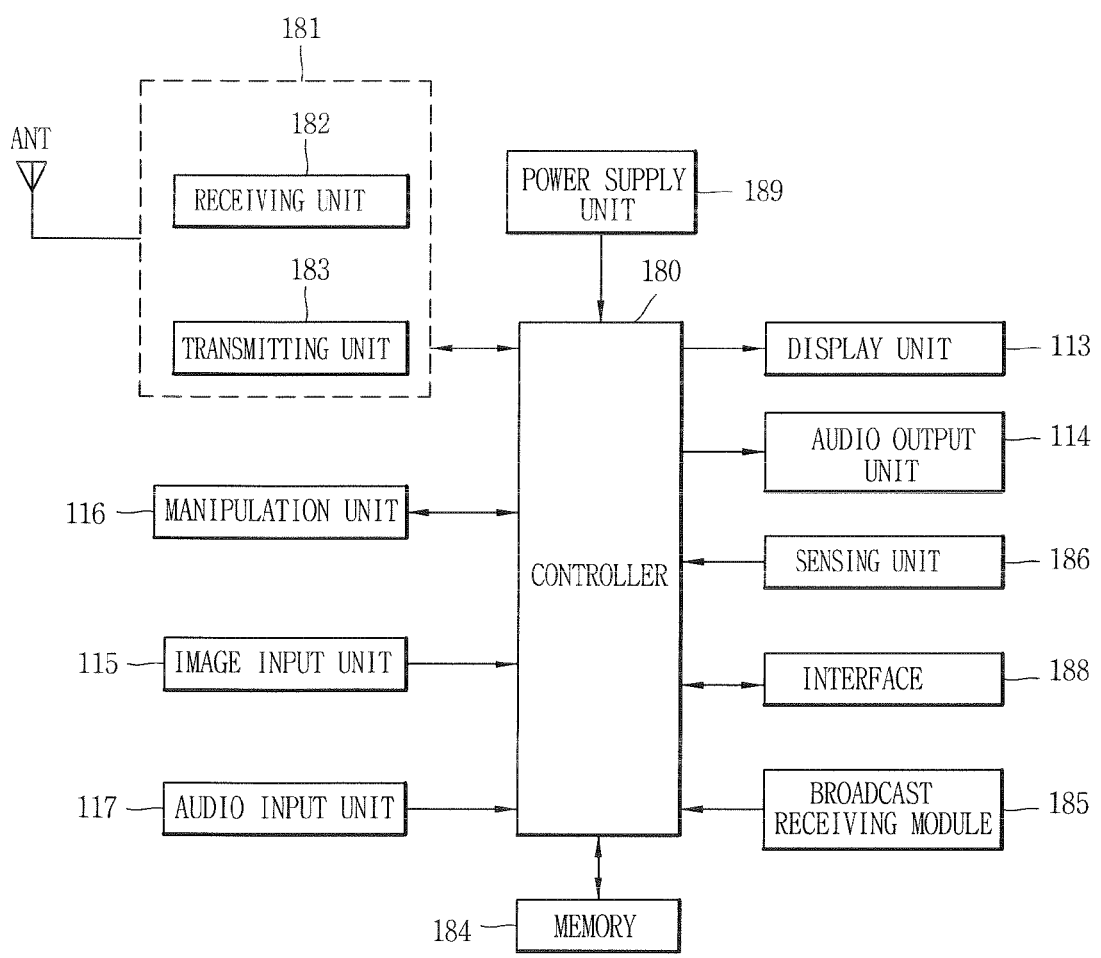
FIG. 15 is a schematic block diagram of a mobile terminal according to an exemplary embodiment of the present invention.

FIG. 15 is a schematic block diagram of a mobile terminal according to an exemplary embodiment of the present invention.

The watch type mobile terminal according to an exemplary embodiment of the present invention includes the display unit 113, the audio output unit 114, the audio input unit 115, the user input unit 116, a power supply unit 189, a controller 180, a wireless communication module 181, a memory 184, a broadcast receiving module 185, a sensing unit 186, an audio input unit 187, and an interface 188.

The controller 180 (such as a microprocessor or the like) typically controls the general operations of the mobile terminal. For example, the controller 180 performs controlling and processing associated with voice calls, data communications, video calls, and the like.

The wireless communication module 181 transmits and receives a radio signal to and from a mobile communication base station via an antenna. For example, the wireless communication module 181 handles transmission and reception of voice data, character data, image data, video data, and control data under the control of the controller 180, for which the wireless communication module 181 includes a transmission unit 162 for modulating a signal to be transmitted and transmitting it and a reception unit 183 for demodulating a received signal.

The user input unit 116 provides key input data inputted to control the operation of the terminal by the user to the controller 180. The user input unit 116 may be configured as a dome switch, a touch pad (constant voltage/capacitance), jog wheel, jog switch and so on.

The image input unit 115 processes image frames of still images or moving images obtained by an image sensor in a video telephony mode or an image capture mode. Further, the processed image frames are converted into image data that can be displayed on the display unit 113 and outputted to the display unit 113.

The image frames processed by the image input unit 115 can be stored in the memory 184 or transmitted to an external device through the wireless communication module 181 under the control of the controller 180.

The audio input unit 117 receive sounds (audible data) via a microphone (or the like) in a phone call mode, a recording mode, a voice recognition mode, and the like, and can process such sounds into electrical audio data. The processed audio (voice) data may be converted for output into a format transmittable to a mobile communication base station (or other network entity) via the wireless communication module 181 in case of the phone call mode. In case of the recording mode, the processed voice data is outputted to be stored in the memory 184.

The audio input unit 117 may implement various types of noise canceling (or suppression) algorithms to cancel (or suppress) noise or interference generated in the course of receiving and transmitting audio signals.

The display unit 113 may display information processed in the watch type mobile terminal. For example, when the watch type mobile terminal is in a phone call mode, the display unit 113 may display a User Interface (UI) or a Graphic User Interface (GUI) associated with a call or other communication (such as text messaging, multimedia file downloading, etc.). When the watch type mobile terminal is in a video call mode or image capturing mode, the display unit 113 may display a captured image and/or received image, a UI or GUI under the control of the controller 180. When the display unit 113 is configured to include a touch screen, it may be also used as an input device as well as as an output device.

The audio output unit 114 converts audio data received from the wireless communication module 181 or audio data stored in the memory 184 and output the same to the exterior under the control of the controller 180 in a call signal reception mode, a call mode, a recording mode, a voice recognition mode, a broadcast receiving mode, and the like.

Also, the audio output unit 114 outputs an audio signal related to the functions (e.g., a call signal reception sound, a message reception sound, etc.) performed in the watch type mobile terminal.

The sensing unit 186 detects a current status of the watch type mobile terminal such as the location of the watch type mobile terminal, the presence or absence of user contact with the watch type mobile terminal (i.e., touch inputs), whether or not the buckle unit 130 is connected, and the like, and generates commands or signals for controlling the operation of the watch type mobile terminal. Also, the sensing unit 186 handles a sensing function related to whether or not the power supply unit 170 supplies power, whether the interface unit 188 is coupled with an external device.

The interface unit 188 serves as an interface by which at least one external device may be connected with the watch type mobile terminal. For example, the external devices may include wired or wireless headset ports, an external power supply (or battery charger) ports, wired or wireless data ports, card socket for accommodating a SIM (Subscriber Identification Module) card or a UIM (User Identity Module) card. The interface unit 188 may be used to receive inputs (e.g., data, information, power, etc.) from an external device and transfer the received inputs to one or more elements within the watch type mobile terminal or may be used to transfer data between the mobile terminal and an external device.

The memory 184 may store software programs or the like used for the processing and controlling operations performed by the controller 180, or may temporarily store data (e.g., a phonebook, messages, still images, video, etc.) that have been outputted or which are to be outputted.

The memory 184 stores a program for controlling the operation of the watch type mobile terminal according to an exemplary embodiment of the present invention. The memory 184 includes at least one type of storage medium including a Flash memory, a hard disk, a multimedia card, a card-type memory (e.g., SD or DX memory, etc), a Random Access Memory (RAM), a Read-Only Memory (ROM), etc.

The broadcast receiving module 185 receives broadcast signals and/or broadcast associated information from an external broadcast management server (or other network entity) via a broadcast channel, converts them into a broadcast data form that can be outputted to the display unit 113, and outputs the same to the controller 180. Also, the broadcast receiving module 185 receives supplementary data (e.g., electric program guide (EPG), a channel list, and the like) related to a broadcast. The broadcast data and supplementary data converted in the broadcast receiving module 185 may be stored in the memory 184.

The power supply unit 189 receives external power (via a power cable connection) or internal power (via a battery of the mobile terminal) and supplies appropriate power required for operating respective elements and components under the control of the controller 180.

As described above, the input unit of the watch type terminal is disposed on the buckle unit to minimize the mounting space of the input unit, thus reducing the size and thickness of the watch type mobile terminal and implementing a slim design.

Also, because power of the watch type terminal is turned on when the buckle unit is connected, the user can conveniently turn on and off power of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A watch type mobile terminal comprising:
   a main body having a wireless communication module;
   a band having first and second band portions connected with first and second ends of the main body, respectively;
   a buckle unit installed in the band and configured to fasten or unfasten the band;
   a signal generating unit mounted in the buckle unit and electrically connected with the main body, the signal generating unit being configured to generate a first signal for turning on power of the main body when the buckle unit is fastened; and
   a manipulation unit mounted in the buckle unit and inputting information to the main body according to a user manipulation,
   wherein the manipulation unit comprises:
   a slider slidably mounted on an outer surface of the buckle unit and disposed to be movable in both directions; and
   a switch disposed in the interior of the buckle unit, generating a second signal according to a sliding movement of the slider, and having first and second switches in contact with both ends of the slider, respectively.

2. The mobile terminal of claim 1, wherein the buckle unit comprises:
   a first buckle unit connected with the first band portion connected with the first end of the main body;
   a second buckle unit connected with the second band portion connected with the second end of the main body; and
   a fastening unit for fastening or separating the first and second buckle units,
   wherein the signal generating unit is disposed in one of the first and second buckle units.

3. The mobile terminal of claim 2, wherein the signal generating unit comprises a switch mounted in the first buckle unit and pressed according to a contact with the second buckle unit.

4. The mobile terminal of claim 2, wherein the fastening unit comprises a pair of magnets mounted in the first and second buckle units, respectively, and the signal generating unit comprises a magnetic sensor mounted in at least one of the first and second buckle units and sensing the strength of a magnetic field of the magnets.

5. The mobile terminal of claim 2, wherein the signal generating unit comprises a contact sensor disposed in the first buckle unit and sensing a contact with the second bucking unit.

6. The mobile terminal of claim 1, wherein the signal generating unit is configured to turn off power of the main body when the connection of the buckle unit is released.

7. The mobile terminal of claim 1, wherein the signal generating unit is connected with the main body by a flexible printed circuit board (FPCB), and the band comprises a through hole through which the FPCB passes.

8. A watch type mobile terminal comprising:
a main body having a wireless communication module;
a band having first and second band portions connected with first and second ends of the main body, respectively;
a buckle unit mounted to the band and detachably attaching the band to the user's wrist; and
a manipulation unit mounted on one surface of the buckle unit and inputting information to the main body according to a user manipulation,
wherein the manipulation unit comprises:
a slider slidably mounted on an outer surface of the buckle unit and disposed to be movable in both directions; and
a switch disposed in the interior of the buckle unit, generating a signal according to a sliding movement of the slider, and having first and second switches in contact with both ends of the slider, respectively.

9. The mobile terminal of claim 8, wherein the buckle unit comprises:
a first buckle unit fixed to the first band portion connected with the first end of the main body;
a second buckle unit fixed to the second band portion connected with the second end of the main body; and
a fastening unit for fastening or separating the first and second buckle units,
wherein the manipulation unit is disposed on at least one of the first and second buckle units.

10. The mobile terminal of claim 9, wherein the manipulation unit is configured to input at least one of an ON/OFF command of power of the main body, a call command, a cancel command, a command for moving a cursor or a pointer, and a command for adjusting a sound or a state amount of graphics.

11. The mobile terminal of claim 9, wherein the manipulation unit is configured to input an execution command of a pre-set operation mode previously set in the main body.

12. The mobile terminal of claim 11, wherein the operation mode comprises at least one of a standby mode, a menu display mode, a call mode, and a text message transmission/reception mode.

13. The mobile terminal of claim 8, wherein the main body further comprises a display unit configured to output visual information, and the first and second switches generate a signal for moving at least one of a cursor, a pointer, graphics, and an icon displayed on the display unit according to a movement direction of the slider.

* * * * *